(12) United States Patent
Covell et al.

(10) Patent No.: US 7,480,259 B2
(45) Date of Patent: Jan. 20, 2009

(54) SYSTEM AND METHOD FOR ESTABLISHING A PARALLEL CONVERSATION THREAD DURING A REMOTE COLLABORATION

(75) Inventors: Michele Covell, Palo Alto, CA (US); Nina Bhatti, Mountain View, CA (US); Henry Harlyn Baker, Los Altos, CA (US); W. Bruce Culbertson, Palo Alto, CA (US); Michael Harville, Palo Alto, CA (US); Thomas Malzbender, Palo Alto, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1215 days.

(21) Appl. No.: 10/683,135

(22) Filed: Oct. 9, 2003

(65) Prior Publication Data
US 2005/0078613 A1    Apr. 14, 2005

(51) Int. Cl.
*H04L 12/18* (2006.01)
*H04M 3/56* (2006.01)
(52) U.S. Cl. ............... 370/260; 370/261; 379/202.01
(58) Field of Classification Search ............. 345/14.08, 345/14.09; 370/260, 261; 379/202.01–206.01; 348/14.08, 14.09
See application file for complete search history.

(56) References Cited

U.S. PATENT DOCUMENTS

| | | | | |
|---|---|---|---|---|
| 5,113,431 A | * | 5/1992 | Horn | 379/93.14 |
| 5,559,875 A | * | 9/1996 | Bieselin et al. | 379/202.01 |
| 6,178,237 B1 | | 1/2001 | Horn | |
| 6,501,739 B1 | * | 12/2002 | Cohen | 370/260 |
| 6,608,636 B1 | | 8/2003 | Roseman | |
| 2003/0035527 A1 | | 2/2003 | Baker | |
| 2003/0182374 A1 | | 9/2003 | Haldar | |
| 2004/0006595 A1 | * | 1/2004 | Yeh et al. | 709/204 |

OTHER PUBLICATIONS

M Kobayashi et al—"Virtual Conference Room: A Metaphor For Multi-User Real-Time Conferencing Systems"—2nd IEEE Int'l Workshop on Human & Robot Communication—Nov. 3, 1993.
S Cogdill et al—"Backchannel: Whispering In Digital Conversation"—Hawaii International Conference on System Sciences 2001—Jan. 3, 2001—pp. 1551-1558.

* cited by examiner

*Primary Examiner*—Harry S Hong

(57) ABSTRACT

Methods and systems for utilizing a parallel conversational thread during a remote collaboration are described. In one embodiment, a managing entity is utilized to establish a first communications path for a remote collaboration of at least two parties. Then, a request for a parallel conversation is received from at least one of the at least two parties during the remote collaboration. The managing entity then establishes a second communications path for the parallel conversation between the at least two parties. Wherein, the enabling of the parallel conversation on the second communications path is performed without inhibiting the first communications path, such that a portion of a first party can have a parallel conversation with a portion of a second party on the second communications path while the first communications path for the remote collaboration remains active.

37 Claims, 5 Drawing Sheets

SYSTEM AND METHOD FOR ESTABLISHING A PARALLEL CONVERSATION THREAD DURING A REMOTE COLLABORATION

TECHNICAL FIELD

Embodiments of the present invention relate to remote communication. More specifically, embodiments of the present invention relate to supporting parallel conversation threads during remote communications.

BACKGROUND ART

There are many advantages to remote collaboration between groups. It allows meetings to occur on a more regular basis between remote colleagues, without incurring the expense and personal stresses of frequent business travel. True collaboration often requires many informal meetings. Such meetings are often most useful when there is natural support for parallel lines of discussion.

For example, when meetings occur with all participants in one physical location, there typically will be one primary line of discussion or a small number of parallel "break-out" lines of discussion. These discussions are typically comparatively long lived (10 minutes or more) and open to members joining or leaving. At the same time, several simultaneous side discussions will typically start and end between collaborators. These side conversations have a more confidential quality to them, with participation being through explicit initiation or invitation, and they tend to be shorter lived (sometimes as short as a minute). Such side conversations have various levels of required confidentiality but, even when not sensitive, will often be best done "privately" so as to avoid stalling or side-tracking the main lines of discussion.

There are many video conferencing systems that are aimed at reducing the amount of travel required while still allowing collaboration between remote groups of participants. Most provide support for a single thread of communication between the remote participants. Audio, video, whiteboard, and computer files can all be shared between the remote groups but the sharing is done from "site-to-site" with little or no support for parallel, simultaneous discussion threads involving subsets of people from the different groups. This hinders or completely prevents the type of "break-out" sessions and "private aside" discussions that are useful between subsets of large collaborative teams.

Audio conferencing systems provide some degree of support for private, side commentary. However, these systems support side commentary by assuming that each of the various participants is using a separate telephone handset. An even greater limitation of these systems is that they interfere with (e.g., mute) the channels of the participants who have not been invited to participate in the private conversation. These excluded lines are isolated and are unable to continue with their discussion in parallel with the private conversation.

Accordingly, a more efficient way of supporting multiple threads during remote collaboration is desirable.

DISCLOSURE OF THE INVENTION

Embodiments of the present invention pertain to methods and systems for supporting and utilizing parallel conversational threads during a remote collaboration. In one embodiment, a managing entity is utilized to establish a first communications path for a remote collaboration of at least two parties. Then, a request for a parallel conversation is received from at least one of the at least two parties during the remote collaboration. The managing entity then establishes a second communications path for the parallel conversation between the at least two parties. Wherein, the enabling of the parallel conversation on the second communications path is performed without inhibiting the first communications path, such that a portion of a first party can have a parallel conversation with a portion of a second party on the second communications path while the first communications path for the remote collaboration remains active.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

In general, embodiments of the present invention use a managing entity to provide a remote conference environment that maintains the thread of the original discussion of the main group while also providing any number of parallel discussion forums. These parallel discussion forums may be ongoing, forming and dissolving, moving between different people, and the like. Furthermore, the parallel discussions may be performed without deleteriously effecting the original and ongoing conference conversation, thereby allowing for a more natural flow of group energies and synergies. The remote conference environment may be a single room, or two or more rooms connected for purposes of communication. In one embodiment, the two rooms may be conference rooms, cubicles, offices, or the like. The rooms may be in distinctly separate locations (e.g., Alaska and Hawaii), or they may be two or more rooms in the same building separated by a hallway. In another embodiment, the original discussion and any parallel discussions may occur within the same room.

Managing Entity

Figure 1:
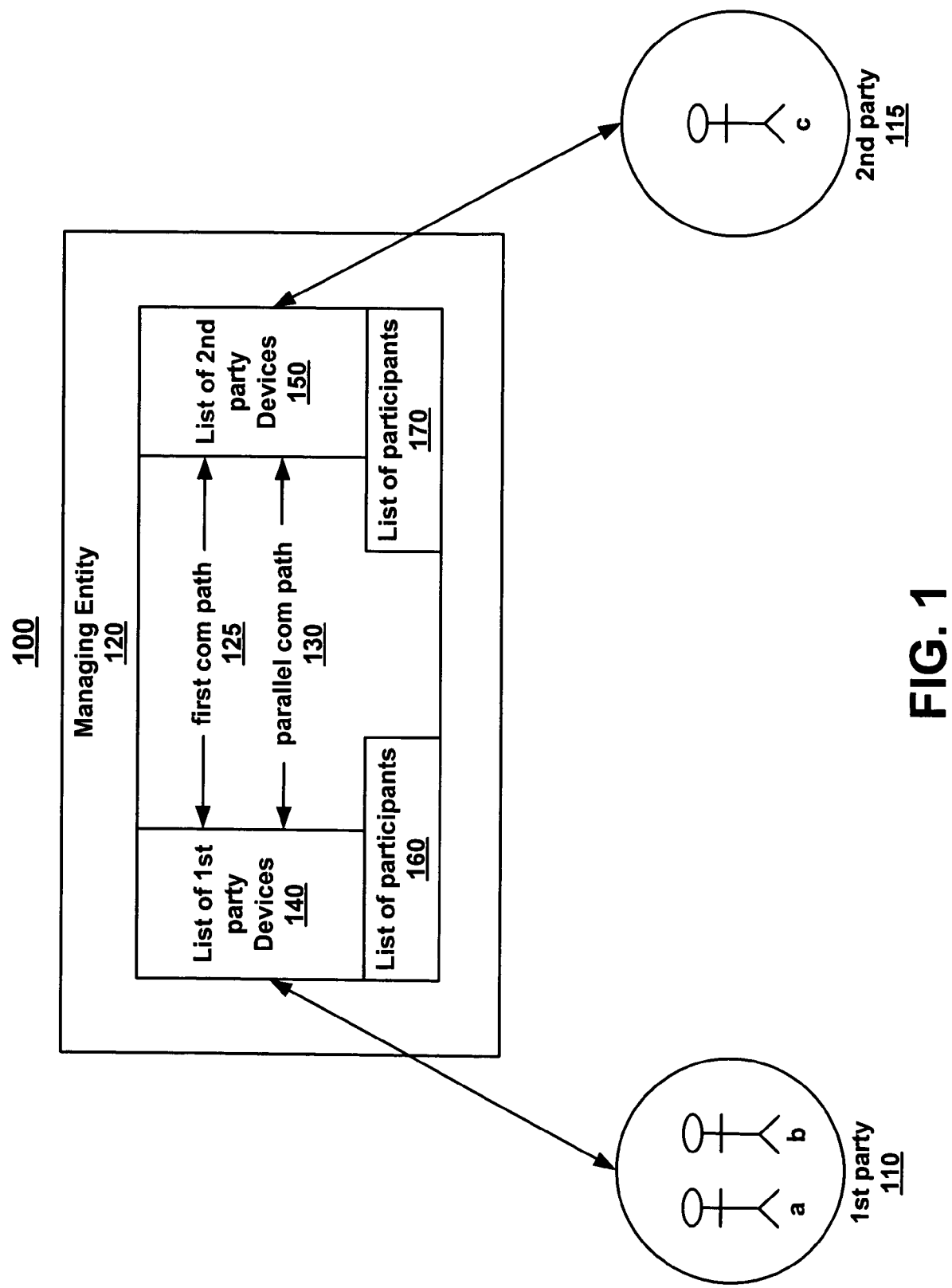
FIG. 1 is a block diagram of an exemplary system for utilizing parallel conversation threads during a remote collaboration according to one embodiment of the present invention.

With reference now to FIG. 1, a block diagram of an exemplary system for utilizing parallel conversational threads during a remote collaboration is shown. In one embodiment, system 100 includes a managing entity 120. Managing entity 120 may be a computing system acting autonomously, or may be controlled by a conference manager overseeing the operations of the managing entity computer entity 120, or a combination thereof. System 100 is configured to communicatively couple a first party 110 and a second party 115. In general, first party 110 (having members a and b) and second party 115 (having a member c) may be in the same or separate rooms. There may also be more than two parties involved in the conference.

In one embodiment, a managing entity 120 is used to establish the remote conference. For example, the managing entity 120 provides the audio and/or video connection capabilities. That is, the managing entity 120 manages the medium for connecting the remote conference to a conference telephone call, a video conference data stream, a network, or the like, which would provide an audio and/or video connection between the remote conference. The initial connection formed by the managing entity 120 is referred to herein as a first communications path. As stated herein, it is an audio, video, or text communications path.

In another embodiment, the managing entity 120 is also used to establish a second communications path referred to herein as a parallel conversation or aside. For example, if a person or persons in one room wish to discuss a secondary issue with a person or persons in the same or another room, a side bar or parallel conversation may be necessary. The managing entity 120 may be contacted by a person or persons during the remote collaboration and a request for a parallel conversation may be received. Once the managing entity has established the second communications path 130, the parallel conversation allows the people included in the parallel conversation to discuss their side topic while the original discussion continues unhindered. In addition, a user may be a member of more than one parallel communications path. For example, in one embodiment, a user may maintain membership in the original discussion, one or more parallel public discussion, and one or more private asides.

In one embodiment, managing entity 120 includes a list of participants (e.g., 160 and 170) involved in the remote collaboration. In another embodiment, managing entity 120 also includes a list of first party devices 140 and second party devices 150 which may be utilized by the members of the at least two parties. Specifically, the devices may be computing systems (e.g., laptops, palmtops, desktops, etc.), audio transmitters/receivers (microphones, telephones, cell phones, speakers, etc.), video transmitters/receivers (cameras, monitors, displays, etc.), or the like which are well known in the art of remote conferencing.

In one embodiment, the list of devices stored by managing entity 120 is manually entered into the managing entity 120 by the user; scanned prior to, or during, the collaboration by the user; scanned prior to, or during, the collaboration by the managing entity 120; visually recognized by the managing entity; selected from a users profile (e.g., database) after receiving the list of participants; or the like. For example, mobile phones and other telephone equipment may be registered by calling a number that allows the telephone call to be digitized and streamed to the managing entity or by entering the cell phone's number in the managing entity's database (e.g., through a graphic user interface (GUI), a wired network, a wireless network, or the like). In one embodiment, laptop and hand-held computer equipment are registered by contacting the managing entity through a GUI, wired network, wireless network, or the like. Thus, the registration process is utilized to provide additional communications devices that the managing entity may then use for forming connections between the collaborative locations.

In one embodiment, the personal communications devices are added to a database of the registered audio/visual input-output (A/V IO) hardware that is in each collaborative location. The position, orientation, calibration, capabilities, and the like, of each piece of fixed equipment are noted in this database. For video devices, the database may track the extent of the room that is within its field of view (for cameras) or is within its viewable cone (for displays). In one embodiment, fixed audio speaker and microphone arrays are handled as non-exclusive arrays, instead of as separate devices. That is, the degree of the array is noted and the signals that are mapped to that array each provide their own "mixing matrix" for that signal playback, corresponding to separate control of the steerable antenna or null pattern. In contrast, video displays are also subdivided into regions with each region of the video display being assigned for some time to a conversational thread (public or private).

In one embodiment, the preferences of the owner of the communications device are noted in the managing entity database so that personal communications devices are not used in a way that is not authorized by the owner. For example, cellular phones are treated as unavailable for use in open-membership discussions, unless the owner overrides that personal preference setting. Similarly, the streaming input/output from PDAs and laptops is treated as being available for open-conversation use, unless the personal preferences specify otherwise.

A similar database may be created for the participants in the collaborative conversation. For each registered participant (e.g., the list of participants 160 and 170), the database may have a name (or some sort of placeholder name, such as "Cupertino #3"), a still image of the person (taken at the time of registration or retrieved from that person's on-line repository), a current location and orientation for the person (corresponding both to a collaborative installation and to their position within that installation), or any other information that a participant is willing to share with their collaborators (e.g., areas of expertise).

With reference still to FIG. 1, in one embodiment, managing entity 120 also includes a first communications path 125 which may be an audio, video, or text communications path. In addition, in all embodiments, managing entity 120 provides support for one, or a plurality of, parallel communications paths (typically shown as 130), which are audio or video communications paths. In general, the parallel communications paths 130 may be constantly forming and dissolving, moving between different people, and adding or removing members of the conferring parties. However, the first communications path remains constant and established throughout the entire life of the remote collaboration event.

Remote Collaboration Environment

Figure 2:
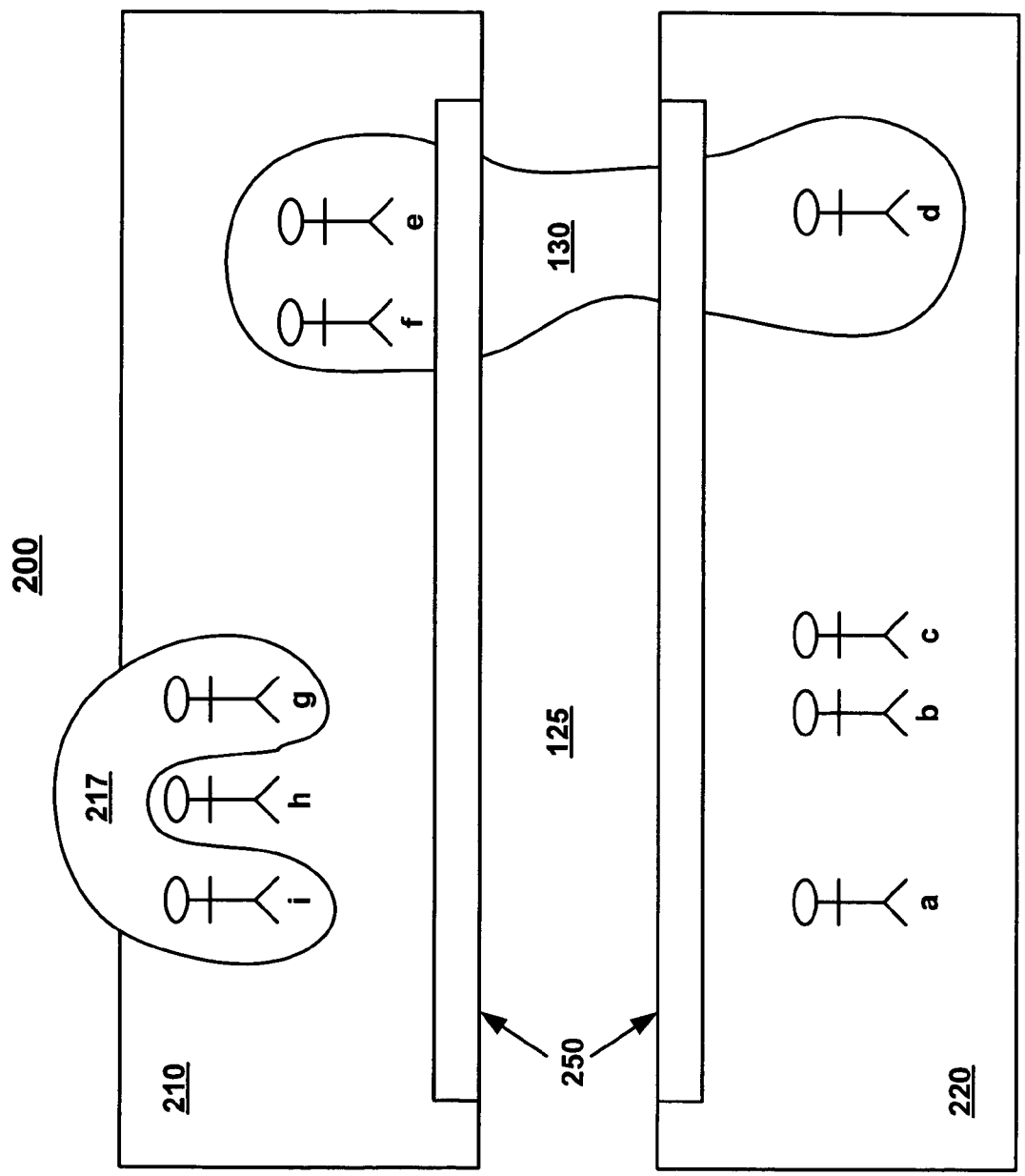
FIG. 2 is a block diagram of an exemplary conference room environment according to one embodiment of the present invention.

With reference now to FIG. 2, a block diagram of an exemplary conference room is shown. In one embodiment, a remote collaboration (e.g., conference call, videoconference, meeting, or the like) may occur in a single room or between two or more rooms. In one embodiment, the remote collaboration between two or more rooms is used to allow a meeting to occur without requiring the participants to travel to meet each other. For example, room 210 may be in Alaska and room 220 may be in Florida. Although they are described in the present embodiment as conference rooms, the conference environments described herein may be any of a plurality of environments such as, for example, a private office, a cubicle, a conference room without display 250, or the like.

In one embodiment, remote collaboration 200 includes visual screens 250. These screens 250 are any type of display which shows occupants of one room the faces, bodies, and/or locations of occupants in another room and vice versa. In another embodiment, the remote collaboration 200 may only provide audio feedback between the conference rooms 210 and 220. In yet another embodiment, the remote collaboration provides audio, video, and text capabilities.

Referring still to FIG. 2, in one embodiment, a remote collaboration 200 is initiated with a single, main line of discussion (e.g., first communications path 125) that is handled by a managing entity 120 of FIG. 1. In general, once the first communications path 125 is established it may remain active throughout the collaborative session, even if no active conversation occurs along the first communications path 125. For example, if all participants are instead fully involved with other discussions. In one embodiment, this first communications path 125 is maintained to provide a default discussion location for remote collaboration participants if and when their other parallel lines of conversation end.

In another embodiment, the remote collaboration 200, including the original discussion and any parallel discussions, may occur within the same room (e.g., parallel discussion 217). For example, a single room may support a plurality of booths, such as a trade show. A remote collaboration is happening between two parties at two different booths. A member of the remote collaboration then starts a parallel conversation with another member of the remote collaboration within the same room but separated physically therein. The present embodiment may also apply to any location (e.g., room, building, park, restaurant, or the like) in which persons (e.g., i and g) are separated with or without physical barriers.

Second Communications Path

Referring again to FIG. 1, in all embodiments, in addition to a first communications path 125 to which the entire room is invited, a second communications path 130 is also supported via managing entity 120. The second communications path 130 may be a public or a private parallel conversation or aside. Specifically, the managing entity 120 enables the parallel conversation on the second communications path without inhibiting the first communications path. Therefore, a portion of the first party (e.g., d of party 220) may have a parallel conversation with a portion of the second party (e.g., e and f of party 210) on the second communications path 130. At the same time, i and g may have a parallel conversation on a third communications path 217 while the rest of the parties (e.g., a, b, c, g, h, and i) continue their remote collaboration on the first communications path 125.

Referring still to FIG. 1, the second communications path 130 utilized for parallel conversation may be established in a plurality of methods. For example, throughout the collaborative sessions (e.g., remote collaborations, conferences, etc.), parallel threads of conversation may be initiated and run simultaneously. These new conversational threads may be started in any of a variety of ways. In addition, the new conversation threads may be started from users in the same room, or from users in different rooms. For example, the parallel conversation may occur within one room of the at least two room remote collaboration (e.g., between two members in the same room), or the parallel conversation may occur between two or more rooms included in the remote collaboration (e.g., one or more member in one room and one or more member in another room).

For example, in one embodiment, a user accesses an explicit graphic user interface (GUI) for starting new breakout sessions with an explicit assignment of participants to these parallel, open-audience lines of conversation. In another embodiment, the user accesses an explicit GUI interface for starting new private-aside sessions with an explicit request forwarded only to the desired participants in the closed-audience lines of conversation.

In yet another embodiment, the managing entity 120 utilizes an audio and/or video analysis to recognize that the participants have split into largely non-interacting groups. For example, the managing entity 120 may use a location analysis (physical or virtual proximity of people/rendered voices/rendered displays), audio analysis (membership inferred via non-overlapping speech between physical/virtual neighbors), video analysis (membership inferred via body orientation, head orientation, and gaze direction between physical/virtual neighbors) or the like to infer that a parallel conversation may be needed. This automatic inference of a new conversational grouping results in an open-audience "breakout" session, including the appropriate membership.

Referring still to FIG. 1, in one embodiment, the managing entity 120 uses audio and/or video analysis to recognize that a participant is providing a social cue to initiate a private conversation with a remote participant. For example, a participant provides a gesture which is recognized by the managing entity 120 during a location analysis (physical or virtual proximity of an "initiator" to the visual representation of a remote participant), audio analysis (that initiator whispering), video analysis (the head orientation, hand location orientation, and gaze direction of the initiator indicating that the remote participant was the one being approached), or the like. This automatic inference of a new request for a private aside results in a request for a new closed-audience private conversation to the managing entity, including the identities of the initiating and approached participants.

In another embodiment, a gesture-based or gesture-augmented interface is used for starting breakout sessions or private-aside conversations. These interfaces may include indicating a new breakout session via a GUI and then populating that session by pointing to each participant or by having each participant raise his hand. Similarly, a new private aside conversation could be initiated by the instigator making a gesture (such as a "hide-whispering-behind-a-hand" while nodding in the appropriate direction) and then pointing or looking at the desired remote participant.

In yet another embodiment, a private device control is used for starting a closed-audience conversation. This may include an initiator electronically controlling a private display from a camera output to crop and zoom that display to be primarily the desired participant or pointing at that participant's rendition without cropping and zooming.

Referring still to FIG. 1, in another embodiment, a visual menu based control is used for starting breakout sessions or private-aside conversations. The visual menus may use pictures (names, or the like) of each participants optionally labeled with their names and other pertinent information (such as areas of expertise or corporate affiliations).

Private or Public Parallel Conversation

With reference still to FIG. 1 and also to FIG. 2, in one embodiment, if a conversational thread (e.g., second communications path 130) is initialized as a private-aside, the request is handled by the managing entity 120 as a "request-response" transaction and may not be mixed into the "background" of non-participant members. For example, the request is handled without requiring a response from the participants. Instead, the audio for the second communications path 130 may be mixed into the audio audible primarily to the indicated participants and the video may be displayed on region of the video display services that is convenient for viewing by the participants.

In one embodiment, during the second communications path 130, if the participant has a private audio device registered with the managing entity 120, the user may monitor membership in the various lines of conversation and adjust the mixing levels that are provided on the personal audio device, to correspond to the mix which allows the user to listen to any or all of the conversations in which he is a member. For example, if the user is participating in a private conversation and in several open-audience conversations, one or more of the levels of the open-audio conversations may be lowered or muted. In another embodiment, the level of the private conversation is lowered or muted to allow the user to hear what is being said in just one of the open conversations being monitored. This personal device also allows the participant to cancel membership in any of the ongoing open- or closed-audience conversations or to join the membership of any open-audience conversation. In another embodiment, the user may record any of the conversations taking place, or an auto record preference may be used. For example, if a user has turned down the volume on the main collaboration to better understand a parallel conversation, the user records the main collaboration discussion (e.g., for review, fast forwarding, analysis, pointers, or the like). This recording may be manually performed, or a setting may be used wherein if the volume on a discussion is set below a certain level an auto record is activated. An aside conversation may be record in the same fashion. Additionally, a user may record (or the auto record setting may record) the conversation in which he or she is actively participating. In yet another embodiment, the user may record (or the auto record setting may record) any or all of the main and parallel conversations.

If a participant has a registered private audio device (e.g., mobile phone, networked handheld computer, or networked laptop) that device may be used for closed-audience conversations. In another embodiment, if a steerable focused audio system is available, that is used to provide acoustic privacy. In yet another embodiment, the available audio devices are used to maximize the audibility (and comprehensibility) of the second communications path 130 at the participant's location. In addition, the available audio devices minimize the second communications path 130 at the locations of all other people in the same acoustic environment (e.g., in a cubicle environment, people in neighboring cubicles and in rich media environments (RME) or conference rooms, other collaborators in the same room) whom are not included in the conversation. A similar approach is taken with visual information that is transmitted to support a close-audience conversation: the most private display is used or, if no private displays are available, the participant has the option of turning the visual display off.

In another embodiment, during a private-aside, a masking or camouflaging of any or all of the participants is used. That is, if a member is taking part in a private aside, any audio or video images of the member may be adjusted such that the private aside is masked. For example, a user taking part in a private-aside may initiate their masked audio or video (for the main conversation or any of the parallel asides). This masked audio or video includes replacing the audio with distracter streams, altering the video to include no body movement (e.g., lip movement, head motion, hand usage, or the like). Therefore, another member of the remote collaboration may not receive an indication (either audio and/or video) that a parallel conversation is occurring, or which members are taking part in the parallel conversation.

Figure 3:
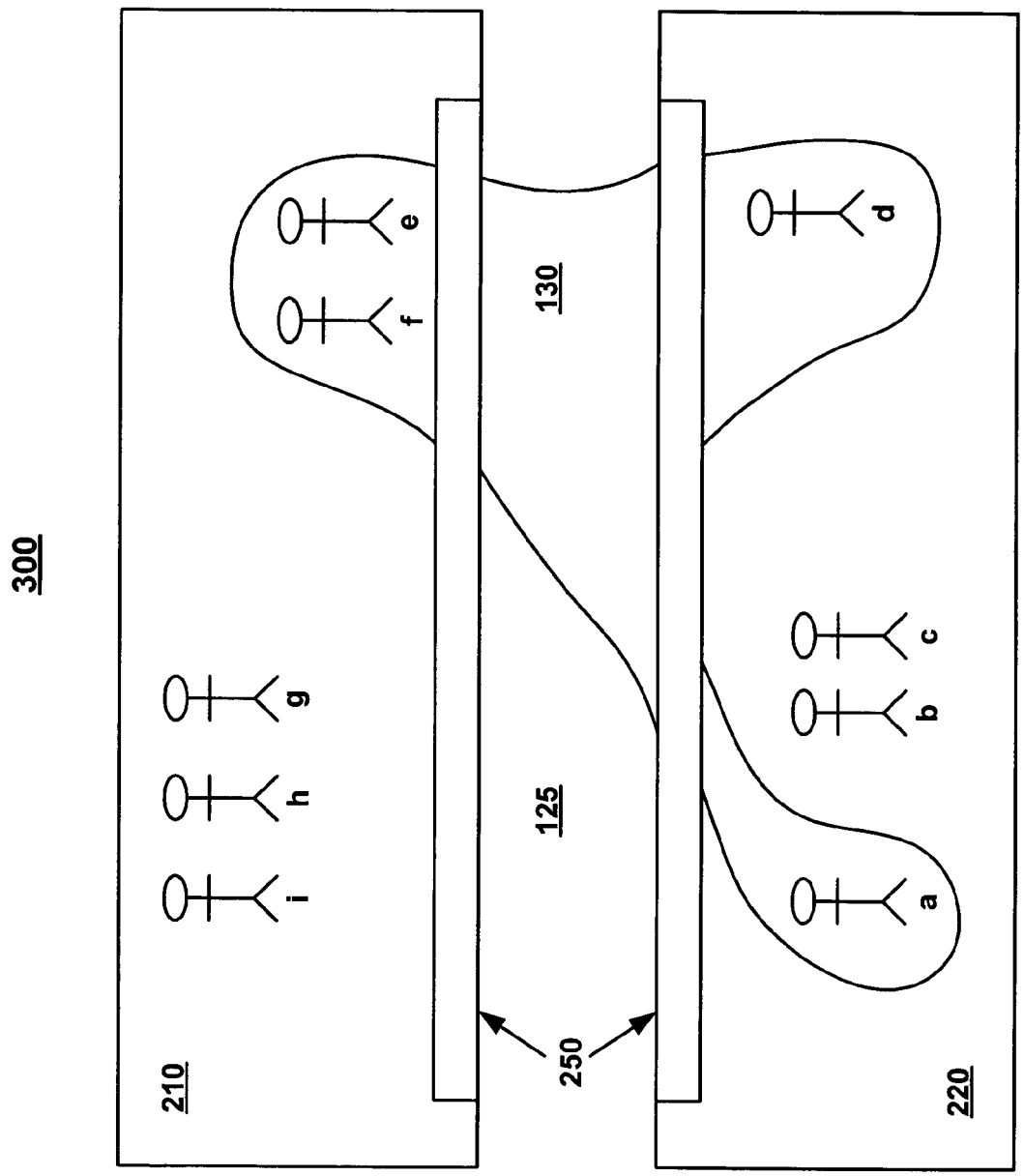
FIG. 3 is a block diagram of an exemplary conference room environment according to another embodiment of the present invention.

With reference now to FIG. 1 and also to FIG. 3, in one embodiment, if a conversational thread (e.g., second communications path 130) is initialized as a public-aside, the conversation is handled by the managing entity 120 as an open line and is made available to non-participant members. For example, if a user (e.g., a of party 220) wants to join other members of a public discussion, the user simply contacts the managing entity 120 and requests access to the public parallel conversation. The managing entity 120 then admits the user (e.g., a of party 220) and informs the other members of the new presence. In one embodiment, the other members are informed via a visual (e.g., icon), audio (e.g., tone, name), or text method.

With reference still to FIG. 1 and also to FIG. 3, in one embodiment, if the conversation thread is initialized as a private-parallel conversation, the conversation is handled by the managing entity 120 as a closed line and is made available to non-participant members only by invitation. For example, if a user (e.g., a of party 220) wants to join other members of a private discussion, the user contacts the managing entity 120 and requests access to the private-parallel conversation. The managing entity 120 then contact the initiator (or another member) of the private-parallel conversation and pass on the user's (e.g., a of party 220) request for admittance. The initiator (or another member) then advises the managing entity 120 to either admit the user (e.g., a of party 220) or deny the user admittance. If the user is admitted, the managing entity 120 then informs the other members of the new presence. In one embodiment, the other members are informed via a visual (e.g., icon), audio (e.g., tone, name), or text method.

Referring now to FIG. 2 and also to FIG. 3, third communications path 217 is ended by the managing entity 120 (of FIG. 1) if the membership falls to zero, or an open-audience conversation has a membership that falls to one or less, or there has been no activity or use of the third communications path 217 for a pre-determined period of time (e.g., a time-out), or the whole conversation is explicitly terminated by any of its then current members. For example, the third communications path 217 may be terminated by any of its members in the same way it was initiated. That is, a third communications path 217 may be terminated with a visual gesture, an audio gesture, a selection of a GUI, a keyboard or mouse input, or the like.

Figure 4:
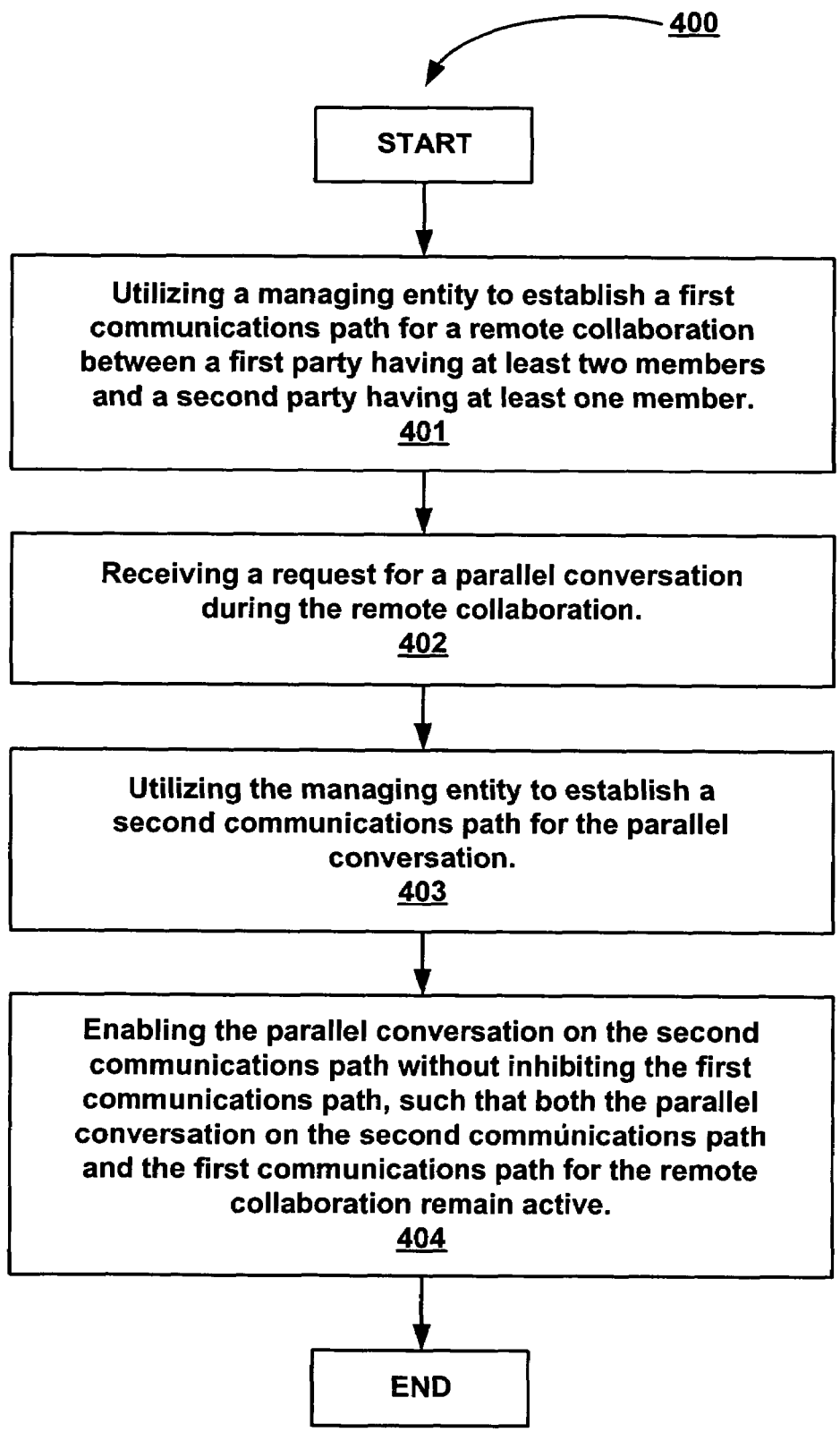
FIG. 4 is a flowchart of a method for establishing parallel conversation threads during a remote collaboration according to one embodiment of the present invention.

With reference now to FIG. 4, a flowchart of a method for establishing a parallel conversation thread during a remote collaboration is shown. In one embodiment, the remote collaboration occurs between two or more separate rooms. The rooms may be separate within the same building or across the planet.

With reference now to step 401 of FIG. 4 and also to FIG. 1, in one embodiment, a managing entity is utilized to establish a first communications path for a remote collaboration between a first party having at least two members and a second party having at least one member. The managing entity 120 may be a computing system such as computer system 500, may be a person operating a computing system 500, may be a network of computing system's 500, or the like. In one embodiment, the first communications path 125 is an audio, video, or text communications path. As described herein, the remote collaboration is any type of meeting wherein at least two parties (e.g., 110 and 115) are in separate locations and are having a real-time or near real-time discussion with one another.

With reference now to step 402 of FIG. 4 and also to FIG. 1, in one embodiment, a request for a parallel conversation is received during the remote collaboration. The request may be received from any member of the remote collaboration. As described herein, in one embodiment, the request is an explicit request to a GUI (e.g., touch screen, stylus, mouse, other tactile component, or the like) from a user, or an audio and/or video request from a user (e.g., a normal voiced request or a whispered request, a head nod, etc.). In another embodiment, the request is generated by the managing entity 120 after an audio and/or video analysis of the remote collaboration provides evidence that a need for a parallel discussion path exists. In yet another embodiment, the request is generated after the managing entity 120 receives a gesture from at least one member of the parties (e.g., a turned head, a gesture to a specific individual, a pointed finger, a whispered voice with a turned head, etc.). The request may also be made in the form of an aside (e.g., parallel conversation) initiation key or a visual or audio menu wherein a user indicates whom should be involved in the parallel conversation. In another embodiment, the request for another parallel conversation may be received during a parallel conversation. For example, a member of a parallel conversation may initiate a second parallel conversation within (or outside of) the first parallel conversation.

In one embodiment, a member may navigate between any of the conversations using visual or audio cues. For example, to converse in the remote collaboration the member speaks in a normal voice, then to converse in the parallel conversation the member reduces his/her voice to a whisper. In another embodiment, the member looks in one general direction (e.g., forward) to take part in a first conversation and looks in a second general direction (e.g., to the side) to take part in a second conversation. In yet another embodiment, the member may use portions of both audio and video cues to navigate between the conversations. In yet another embodiment, the member may use the GUI (or keyboard, etc.) to navigate between the conversations.

With reference now to step 403 of FIG. 4 and also to FIG. 1, in one embodiment, the managing entity is utilized to establish a second communications path for the parallel conversation. In one embodiment, the parallel conversation is established between at least two members of the first party. In another embodiment, the parallel conversation is established between at least one member of the first party and at least one member of the second party. As stated herein, the second communications path is an audio and/or video communications path. For example, the request for a parallel conversation may be received to the managing entity 120 and established along a path such as parallel communications path 130. In one embodiment, the parallel conversation is an aside to the issue being discussed or is a planned departure from the line of the main conversation wherein the entire group breaks down into smaller groups to discuss different topics.

For example, in one embodiment, the parallel conversation is a private request including an explicit list of which members of at least two parties may be allowed to access the parallel conversation. This private conversation may be used to discuss items such as personnel in the meeting (e.g., performance, accomplishments, leadership, teamwork, etc.), private ideas that others in the meeting environment have no need to know, or the like. Therefore, the managing entity allows only specified users access to the parallel conversation.

In another embodiment, the parallel conversation is a public request which has an open access policy for anyone in the at least two parties. This public conversation (or plurality of public conversations) is used to break the group into smaller working groups, or allow like-minded people to discuss like-minded ideas. Thus, while the first communications path 125 remains open to the entire group, the parallel conversations allows a more intimate discussion to occur without deleteriously affecting the main discussion or without tying up or destroying the first communications path 125.

Integration of Personal Communications Devices

Referring still to step 403 of FIG. 4 and also to FIG. 1, in one embodiment, the first or second communications paths utilizes a communications device registered with the managing entity for explicit use during the remote collaboration. That is, in addition to a group communications device for both communications paths 125 and 130, a second communications device may be used for the parallel communications path 130 (or the first communications path 125). For example, in one embodiment, the first communications path 125 is established using a phone or network line which is wired directly to the room. Then, in one embodiment, when the aside is requested the user has a personal communications device (e.g., mobile phone, laptop, PDA, desktop, or the like) which is both registered to the managing entity 120 (e.g., via profile, login, declaration, passive sensors, active sensors, or the like) and available for use, the user then chooses to utilize the second communications device as the primary device for the parallel conversation. In so doing, an additional amount of privacy is maintained. This is substantially different than just making a mobile phone call or logging on to the Internet with a laptop, since the utilization of the device (within the realm of the remote collaboration) is controlled by the managing entity 120 and not just placed into action by a user. In another embodiment, the user utilizes the personal communications device for the first communications path 125 and the group communications device for the parallel discussion. This preference may be made by the user or by the managing entity 120.

With reference now to step 404 of FIG. 4 and also to FIG. 1, in one embodiment, the parallel conversation is enabled on the second communications path without inhibiting the first communications path, such that a both the parallel discussion on the second communications path and the first communications path for the remote collaboration remain active. That is, two or more conversations (discussions, etc.) are maintained within the confines of the remote collaboration without negatively impacting each other. In addition, the parallel discussions may be affected by various management entity 120 tools used to make each conversation more or less audible depending on the user preferences. For example, in one embodiment, if a user is partaking in more than one discussion, selective audio and/or video preferences are used to bring one of the discussions to the forefront while placing other discussions into the background.

Privacy

In another embodiment, if privacy is necessary, a voiced-to-whisper or whispered-to-voice conversion may be possible. For example, one member of a parallel discussion speaks in a clear voice but the receiving member(s) may receive the statement in a whispered voice (for privacy, user preference, etc.). In another embodiment, one member of a parallel discussion may speak in a whispered voice but the receiving member(s) receive the statement in a normal voice. There are a plurality of possible manipulations and preferences that may be utilized by members of the remote collaboration which are well known in the art and may be implemented herein. In one embodiment the managing entity may perform audio enhancement of audio data received from, for example, microphones and/or communication devices in the conference environment. For example, if the locations of microphones and/or communication devices is known, the managing entity can use "beam forming" techniques to enhance the audio quality of the communications session. Beam forming refers to methods known in the art for combining multiple audio signals received by audio sensors at known locations in order to enhance the audio signals emanating from one or more locations or directions relative to the audio sensors. Therefore, if one member is talking quietly, beam forming may be used to enhance the member's voice to others in the conversation. Beam forming may be used in both the first communications path and any parallel communications paths within the remote collaboration. It may also be used in conjunction with voiced-to-whisper and/or whispered-to-voice conversions.

In another embodiment, group selection is used by the audio streams to deliver "group distinct" volume levels. For example, in a large meeting with a large number of participants, grouped physically, the audio stream should reflect the distinctness of their conversations. For example, it is not appropriate to share all voices with all receivers at the same volume. Groups that are "near" (either physically or virtually) should be heard more loudly and groups that are farther away should be less audible. This may be performed by providing an attenuation that is either binary, or sharper than the expected inverse square. A common low volume for all participants outside the immediate group may also be set. In another embodiment, where more public broadcast is desired, zero attenuation may be delivered, thereby effectively giving any virtual speaker a microphone attached to the public address system. Therefore, regardless of the speaker's position in a real (or virtual) room, all listeners will receive the speaker at the same volume.

Some portions of the detailed descriptions are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "transmitting", "assigning", "applying", "organizing", "processing" or the like, refer to the action and processes of a computer system (e.g., FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 5:
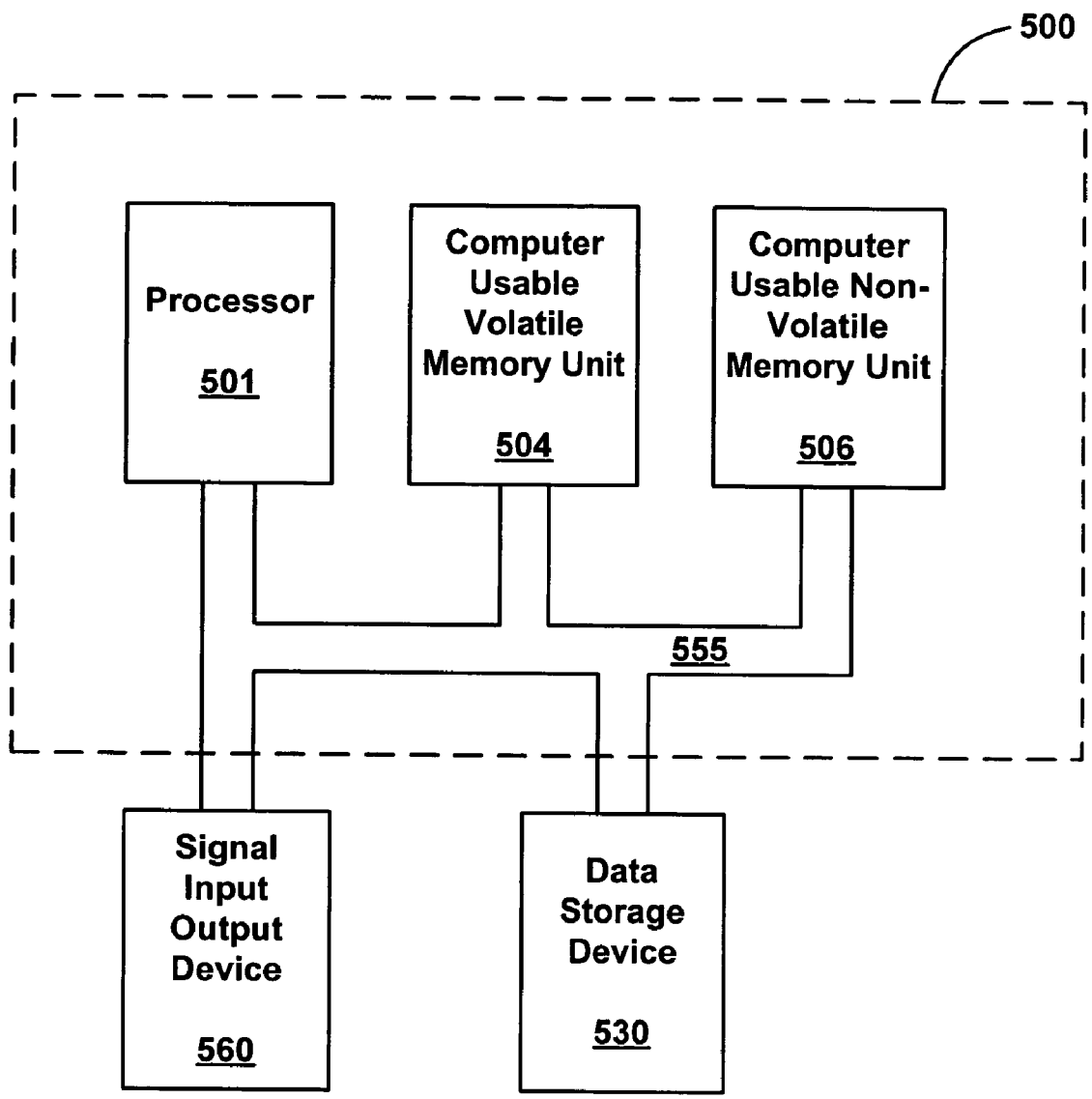
FIG. 5 illustrates a block diagram of an exemplary computer system used in accordance with embodiments of the present invention.

FIG. 5 illustrates a block diagram of an exemplary computer system 500 used in accordance with embodiments of the present invention. System 500 of the present embodiment is well suited to be any type of computing device (e.g., server computer, portable computing device, desktop computer, etc.). Within the discussions of embodiments of the present invention, certain processes and steps are discussed that are realized, in one embodiment, as a series of instructions (e.g., software program) that reside within computer readable memory units of computer system 500 and executed by a processor(s) of system 500. When executed, the instructions cause computer 500 to perform specific actions and exhibit specific behavior that is described in detail herein.

Computer system 500 of FIG. 5 comprises an address/data bus 555 for communicating information and one or more central processors 501 coupled with bus 555 for processing information and instructions. Central processor unit(s) 501 may be a microprocessor or any other type of processor. The computer 500 also includes data storage features such as a computer usable volatile memory unit 504 (e.g., random access memory, static RAM, dynamic RAM, etc.) coupled with bus 555 for storing information and instructions for central processor(s) 501, a computer usable non-volatile memory unit 506 (e.g., read only memory, programmable ROM, flash memory, EPROM, EEPROM, etc.) coupled with bus 555 for storing static information and instructions for processor(s) 501.

System 500 also includes one or more signal generating and receiving devices 560 coupled with bus 555 for enabling system 500 to interface with other electronic devices and computer systems. The communication interface(s) 560 of the present embodiment may include wired and/or wireless communication technology. For example, within the present embodiment, the communication interface 560 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

The system 500 of FIG. 5 may also include one or more optional computer usable data storage devices 530 such as a magnetic or optical disk and disk drive (e.g., hard drive or floppy diskette) coupled with bus 555 for storing information and instructions.

Thus, embodiments of the present invention utilize parallel lines of discussion during remote collaboration (e.g., audio and/or video conferencing between two or more distinct locations). Embodiments of the present invention also support private or semi-private communication within the same remote collaboration context without stalling the main conversation, including when the communication is between remote participants who are in rooms or environments that include others which are not included in the side conversation. Therefore, embodiments of the present invention allow a group to continue with a line of discussion while also allowing subgroups to share information that is sensitive or of limited interest, thereby making better use of the full groups time while allowing rich sub-conversations to be held within informal subgroups.

Embodiments of the present invention also add the capability of having parallel "break-out" and "private-aside" conversations in audio- or video-conferencing environment in natural ways, without side tracking other participants that share the same physical or virtual space. In addition, parallel breakout discussions may support varying degrees of audible and visible separation. For example, between the parallel conversations, the degree of separation may be set by the capabilities of the A/V input and output equipment; by the physical separation of the participants who are in the same room; and by the selected settings of the various participants. For private-aside conversations, the most private mode of audible and visible communication may be used based on the available displays and audio speakers.

In summary, embodiments of the present invention pertain to methods and systems for utilizing a parallel conversational thread during a remote collaboration. In one embodiment, a managing entity is utilized to establish a first communications path for a remote collaboration of at least two parties. Then, a request for a parallel conversation is received from at least one of the at least two parties during the remote collaboration. The managing entity then establishes a second communications path for the parallel conversation between the at least two parties. Wherein, the enabling of the parallel conversation on the second communications path is performed without inhibiting the first communications path, such that a portion of a first party can have a parallel conversation with a portion of a second party on the second communications path while the first communications path for the remote collaboration remains active.

Embodiments of the present invention are thus described. While the present invention has been described in particular embodiments, it should be appreciated that the present invention should not be construed as limited by such embodiments, but rather construed according to the following claims.

What is claimed is:

1. A method for supporting parallel conversational threads during a remote collaboration, said method comprising:

utilizing a managing entity to establish a first communications path for a remote collaboration between a first party having at least two members and a second party having at least one member;

receiving a request for a parallel conversation during said remote collaboration, wherein the request for said parallel conversation is a public request where no member is able to deny any other member access to said parallel conversation thereby allowing access to said parallel conversation for any of said members of said first party or said second party;

utilizing said managing entity to establish a second communications path for said parallel conversation; and enabling said parallel conversation on said second communications path without inhibiting said first communications path, such that both said parallel conversation on said second communications path and said first communications path for said remote collaboration remain active.

2. The method of claim 1 wherein the first communications path is an audio, video, or text communications path.

3. The method of claim 2 wherein a portion of an audio, video, or text communication on the first communications path is recorded.

4. The method of claim 2 wherein the volume of an audio communications on the first communications path to a member having a parallel conversation is reduced such that the audio communications on the second communications path is unhampered.

5. The method of claim 1 wherein the request for said parallel conversation is selected from the group consisting of: an explicit request to a graphic user interface (GUI), an audio request, an audio analysis of the remote collaboration, a video request, a video analysis of the remote collaboration, a gesture, an aside initiation key, or a visual menu.

6. The method of claim 1 wherein the termination of said parallel conversation is selected from the group consisting of: an explicit request to a graphic user interface (GUI), an audio request, an audio analysis of the parallel conversation, a video request, a video analysis of the parallel conversation, a gesture, an aside initiation key, or a visual menu.

7. The method of claim 1 wherein the request for said parallel conversation is received to said managing entity from at least one member of said first party or said second party.

8. The method of claim 1 wherein a second request for a second parallel conversation is a private request including an explicit list of which members of said first party or said second party are allowed access to said second parallel conversation.

9. The method of claim 1 wherein the second communications path is an audio or video communications path.

10. The method of claim 9 wherein a portion of an audio or video communication on the second communications path is recorded.

11. The method of claim 9 wherein the volume of an audio communications on the second communications path to a member having a parallel conversation is reduced such that the audio communications on the first communications path is unhampered.

12. The method of claim 1 wherein the second communications path utilizes a communications device registered with said managing entity for explicit use during said remote collaboration.

13. The method of claim 1 wherein said parallel conversation may be a voiced-to-whisper, or a whispered-to-voice conversion.

14. The method of claim 1 wherein the parallel conversation is established between at least two members of the first party.

15. The method of claim 1 wherein the parallel conversation is established between at least one member of the first party and at least one member of the second party.

16. A managing entity for establishing a parallel conversational thread during a remote collaboration comprising:

a first conversation thread establisher for establishing a remote collaboration between a first party having at least two members and a second party having at least one member; and a parallel conversation thread establisher, wherein said parallel conversation thread establisher establishes a parallel conversation thread during said remote collaboration such that both said first conversation thread and said parallel conversation thread may be utilized simultaneously, wherein the parallel conversation thread establisher establishes said parallel conversation thread as a public parallel conversation thread where no member is able to deny any other member access to said public parallel conversation thread thereby allowing access to said public parallel conversation thread to any members of said first party or said second party.

17. The managing entity of claim 16 wherein said first conversation thread establisher establishes an audio, video, or text communications path.

18. The managing entity of claim 16 wherein said parallel conversation thread is established after an action selected from the group consisting of: an explicit request to a graphic user interface (GUI), an audio request, an audio analysis of the remote collaboration, a video request, a video analysis of the remote collaboration, a gesture, an aside initiation key, or a visual menu.

19. The managing entity of claim 16 wherein the termination of said parallel conversation is performed after an action selected from the group consisting of: an explicit request to a graphic user interface (GUI), an audio request, an audio analysis of the parallel conversation, a video request, a video analysis of the parallel conversation, a gesture, an aside initiation key, or a visual menu.

20. The managing entity of claim 16 wherein the parallel conversation thread establisher establishes said parallel conversation thread after receiving a request from at least one member of said first party or said second party.

21. The managing entity of claim 16 wherein the parallel conversation thread establisher establishes a second parallel conversation thread as a private parallel conversation thread including an explicit list of which members of said first party or said second party are allowed access to said private parallel conversation thread.

22. The managing entity of claim 16 wherein the parallel communications thread establisher establishes an audio or video communications thread.

23. The managing entity of claim 16 wherein the parallel communications thread establisher utilizes a communications device registered with said managing entity for explicit use during said remote collaboration.

24. The managing entity of claim 16 wherein said parallel conversation thread may be a voiced-to-whisper, or a whispered-to-voice conversion.

25. The managing entity of claim 16 wherein the parallel conversation is established between at least two members of the first party.

26. The managing entity of claim 16 wherein the parallel conversation is established between at least one member of the first party and at least one member of the second party.

27. A computer-usable medium having computer-readable program code embodied therein for causing a managing entity to perform a method of utilizing a parallel conversation thread during a remote conference, said method comprising:
   establishing, via a managing entity, a first communications path for a remote conference of a first party having at least two members and a second party having at least one member;
   receiving a request for a parallel conversation during said remote conference, wherein the request for said parallel conversation is a public request where no member is able to deny any other member access to said parallel conversation thereby allowing access to said parallel conversation for any of said members of said first party or said second party;
   utilizing said managing entity to establish a second communications path for said parallel conversation; and
   implementing said parallel communications path on said second communications path without inhibiting said first communications path, such that both said parallel conversation on said second communications path and said first communications path for said remote collaboration remain active.

28. The computer-usable medium of claim 27 wherein the first communications path is an audio, video, or text communications path.

29. The computer-usable medium of claim 27 wherein the request for said parallel conversation is selected from the group consisting of: an explicit request to a graphic user interface (GUI), an audio request, an audio analysis of the remote collaboration, a video request, a video analysis of the remote collaboration, a gesture, an aside initiation key, or a visual menu.

30. The computer-usable medium of claim 27 wherein the termination of said parallel conversation is selected from the group consisting of: an explicit request to a graphic user interface (GUI), an audio request, an audio analysis of the parallel conversation, a video request, a video analysis of the parallel conversation, a gesture, an aside initiation key, or a visual menu.

31. The computer-usable medium of claim 27 wherein the request for said parallel conversation is received to said managing entity from at least one member of said first party or said second party.

32. The computer-usable medium of claim 27 wherein a second request for a second parallel conversation is a private request including an explicit list of which members of said first party or said second party are allowed access to said aside.

33. The computer-usable medium of claim 27 wherein the second communications path is an audio or video communications path.

34. The computer-usable medium of claim 27 wherein the second communications path utilizes a communications device registered with said managing entity for explicit use during said remote collaboration.

35. The computer-usable medium of claim 27 wherein said parallel conversation may be a voiced-to-whisper, or a whispered-to-voice conversion.

36. The computer-usable medium of claim 27 wherein the parallel conversation is established between at least two members of the first party.

37. The computer-usable medium of claim 27 wherein the parallel conversation is established between at least one member of the first party and at least one member of the second party.

* * * * *